O. TALTON.
MEAT CHOPPING AND POUNDING MACHINE.
APPLICATION FILED FEB. 1, 1907.
901,267.
Patented Oct. 13, 1908.
2 SHEETS—SHEET 1.
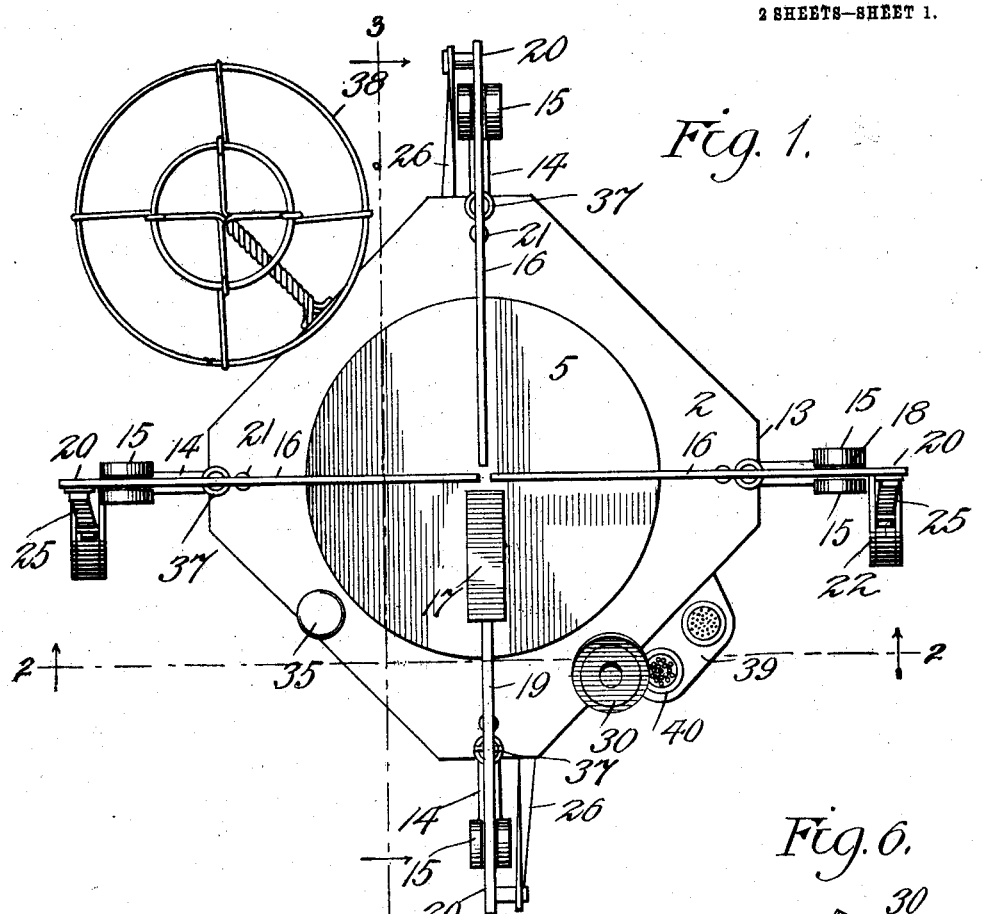
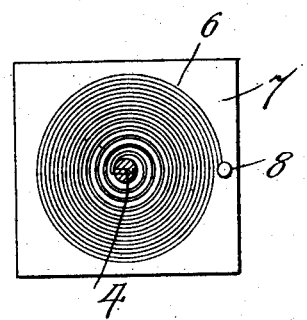
Inventor
Orange Talton
Witnesses
By Victor J. Evans
Attorney O. TALTON.
MEAT CHOPPING AND POUNDING MACHINE.
APPLICATION FILED FEB. 1, 1907.
901,267.
Patented Oct. 13, 1908.
2 SHEETS—SHEET 2.
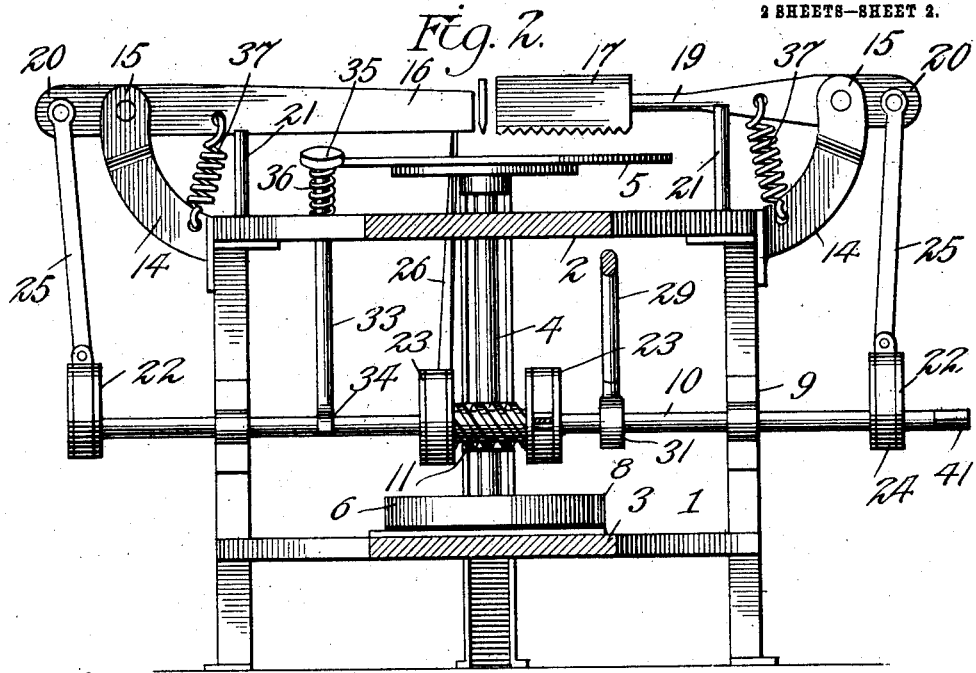
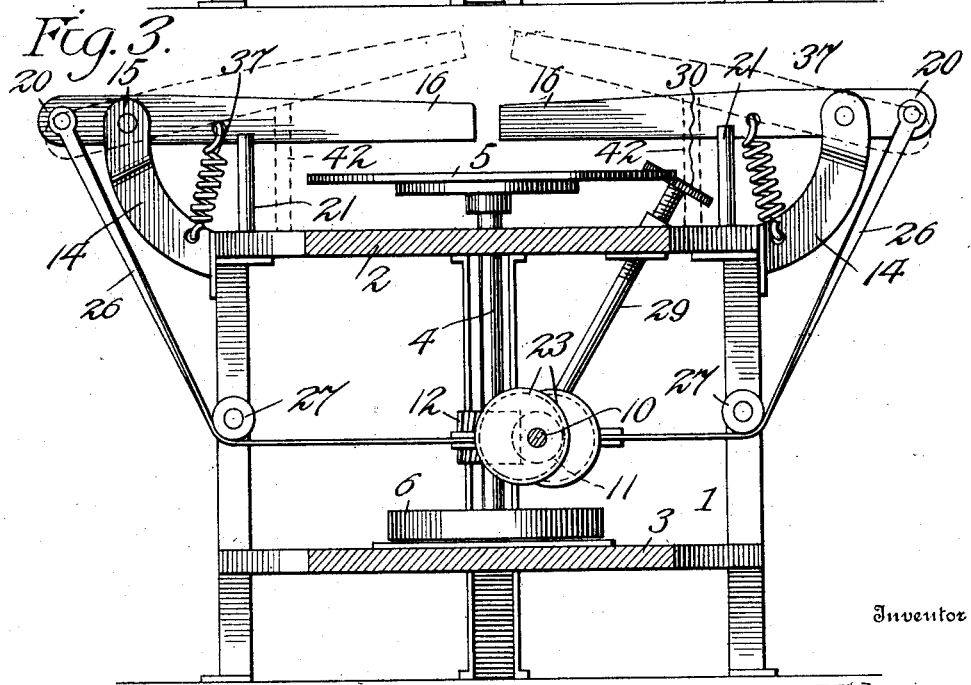
Witnesses
Geo Ackman
K. Allen
Inventor
Orange Talton
By Victor J. Evans
Attorney

UNITED STATES PATENT OFFICE.

ORANGE TALTON, OF KREBS, OKLAHOMA.

MEAT CHOPPING AND POUNDING MACHINE.

No. 901,267.　　　Specification of Letters Patent.　　　Patented Oct. 13, 1908.

Application filed February 1, 1907. Serial No. 355,228.

*To all whom it may concern:*

Be it known that I, ORANGE TALTON, a citizen of the United States, residing at Krebs, in district 15, Oklahoma, have invented new and useful Improvements in Meat Chopping and Pounding Machines, of which the following is a specification.

The invention relates to an improvement in meat chopping and pounding machines of the type in which the chopping and pounding is limited to so affecting the material as will render the same more tender as a food product.

The main object of the present invention is the production of a machine embodying a series of knives and a pounder, the construction providing for the uninterrupted movement of the material and the intermittent action of the knives and pounder during such movement, whereby the fibers of the meat are readily broken and separated to render the same more tender in use as a food product.

The invention will be described in the following specification, reference being had particularly to the accompanying drawings, in which:—

Figure 1 is a plan view of a machine constructed in accordance with my invention, Fig. 2 is a vertical section of the same on the line 2—2 of Fig. 3, Fig. 3 is a vertical section of the same on the line 3—3 of Fig. 1, Fig. 4 is a plan of the motor, the main shaft being shown in section, Fig. 5 is a detail plan illustrating the means for driving the auxiliary shaft from the main shaft, Fig. 6 is a sectional detail partly in elevation illustrating the braking means for the auxiliary shaft.

Referring particularly to the drawings, wherein is shown the preferred embodiment and details, my improved machine comprises a main frame 1 including upper and lower platforms 2 and 3 supported upon the side structures or frames of a size and configuration to support the platforms in spaced relation and above a floor or the like. Rotatably supported in the platform is the main shaft 4, said shaft being preferably centrally disposed relative to the platform and arranged to extend above the upper platform, being provided at its upper end with a relatively fixed table 5.

A motor, as a coil spring 6 of substantial power, is supported upon a base plate 7 secured centrally of the lower platform, the spring being coiled about the main shaft 4 with its inner end secured to said shaft, the opposite end of the spring being fixed to a stud 8 projecting from the base plate. Supported in bearings 9 fixed to the side members of the main frame above the lower platform is an auxiliary shaft 10, said shaft being of a length to extend some distance beyond the side members of the frame, as clearly shown in Fig. 2. On the shaft 10, immediately adjacent the main shaft, is mounted a worm gear 11, arranged to mesh with a coöperating gear 12 provided on the main shaft, whereby revolution of the main shaft will impart similar movement to the auxiliary shaft.

The upper platform 2 is approximately square in outline, with the corners cut off to provide diagonally opposed edges 13. The side members of the main frame depend in alinement with the edges 13, and each supports immediately beneath the adjacent edge 13 an arm 14, which is outwardly and upwardly curved relative to said edge, the upper terminal of the arm lying on a plane above the platform and beyond the same being preferably formed to present spaced ears 15.

The operating members of the machine are mounted on the respective arms 14, and include three knives 16 and a pounder 17. The knives 16 are preferably of ordinary blade-like formation, pivotally mounted at 18 between the ears 15 of three of the respective arms, said blades extending beyond the arm supports to overlie the table 5, terminating at their inner ends adjacent the central point of the table. The pounder 17, which comprises a block of substantial weight roughened or serrated on its inner surface is pivotally supported by an arm 19 in one of the arms 14, as clearly shown in Figs. 1 and 2. The blades 16 and also the arm 19 project beyond their pivotal supports, as at 20, to provide for their operation in a manner to be presently described. As thus arranged the knives and pounder overlie the table 5, and are adapted to operate upon any material resting on the table. In order to insure such effect of the operating members as will render the material more tender, means must be provided for preventing a complete cutting of the material in the operation of the knives. To this end I secure posts 21 on the upper platform 2, one for each of the operating members and disposed directly in the path thereof, the upper terminal of the post being so positioned relative to the operating plane of the knife or pounder as to terminate the downward movement of the latter some distance above the upper surface of the table 5. The operating members will thus properly affect the meat without cutting the same entirely through, as is the object of some machines.

A series of disks 22, corresponding in number to the number of operating members, are eccentrically arranged upon the auxiliary shaft 10, two of said disks being arranged adjacent the respective ends of the shaft, and the remaining two on opposite sides of the worm gear 11 and immediately adjacent thereto. Each of the disks is peripherally cut away to provide an annular channel 23, in which is movably supported a strap 24. The end disks 22 are connected with the respective operating members 16 and 17 extending in parallel relation to the shaft 10 through the medium of flexible connections 25, connected at one end to the strap 24 and at the opposite end to the projecting portions 20 of the members. The two remaining operating members, which extend at right angles to the plane of the shaft 10 are connected with intermediate disks 23 through the medium of flexible connections 26 connected to the straps 24 of the particular disks to the projecting portions 20 of these members. As the members now referred to, however, project at right angles to the plane of the shaft 10 the connections 26 are intermediate the disks and members passed beneath the rollers 27 secured on the side bars of the main frame.

To provide a braking control of the movement of the auxiliary shaft I mount in the upper platform 2 an interiorly threaded nipple 28, in which is disposed a threaded rod 29. The upper end of the rod beyond the platform is provided with a milled head 30, the lower end being provided with a semicylindrical braking shoe 31 designed to bear upon a braking disk 32 secured upon the auxiliary shaft 10. The pressure of the shoe upon the disk 32 may be regulated in an obvious manner by turning the rod 29, thereby controlling the speed of the auxiliary shaft as desired. An auxiliary braking rod 33 is slidably mounted in the upper platform 2, being formed at the lower end with a brake shoe 34 to partially encircle the auxiliary shaft 10, the upper end of the rod beyond the platform being formed with a head 35. A coil spring 36 encircles the rod between the head and platform and is tensioned to normally maintain the rod in position to support the shoe 34 out of contact with the auxiliary shaft. The auxiliary brake provides a simple means which may be quickly operated to effect a momentary change in the speed of the auxiliary shaft.

Each arm 14 is connected with the operating member supported thereby in advance of the pivotal connection through the medium of a coil spring 37, designed to move the operating members into effective coöperation with the material supported by the table.

A meat support or frame 38 is secured to one edge of the upper platform 2, in position to receive the material before and after treatment by the machine, and in opposed relation to said frame I secure to the table a condiment holder 39 in which one or more receptacles 40 may be provided for holding salt and pepper and other condiments for use with the meat to be treated.

In operation the motor is wound through the medium of a suitable key engaging the squared end 41 of the auxiliary shaft 10, after which the brake rod 29 may be operated to lock the shaft against rotation. The meat properly prepared is laid upon the table 5, and the brake on the auxiliary shaft released. The motor operates to alternately cut and pound the meat, the latter being supported upon the continuously moving table. The material is thus so treated as to render the same tender, the rapidity of movement of the operating members necessitating but a short time in such tendering operation.

If desired auxiliary pins 42, of greater height than the fixed pins 21 may be interposed between the operating members and the upper platform, whereby to support the inner or operative ends of said members so spaced above the table 5 as to permit the convenient introduction or withdrawal of the meat.

While preferring the details of structure above described and shown in the drawings, I do not desire to limit myself specifically thereto, and comprehend as within the spirit of the present invention such changes and variations as may fall within the scope of the appended claims.

Having thus described the invention what is claimed as new, is:—

1. A machine of the class described comprising a main frame, a motor supported thereby, a table revolved by the motor, a series of meat treating implements supported by the frame and operative above the table, said implements being arranged respectively at right angles to each other, a single means for simultaneously operating said implements in one direction by the motor, and means for independently operating said implements in the opposite direction.

2. A machine of the class described comprising a main frame, a motor supported thereby, a table revolved by the motor, a series of meat treating implements supported by the frame and operative above the table, means for simultaneously operating said implements in one direction, means for independently operating said implements in the opposite direction, and means for limiting the movements of said implements toward the table.

3. A machine of the class described comprising a main frame, a motor carried thereby, a main shaft supported in the frame and operated by the motor, a table secured upon the shaft, an auxiliary shaft driven by the main shaft, a series of independent meat treating implements supported by the frame and operative above the table, said implements being arranged at respective right angles with relation to each other, means actuated by the auxiliary shaft for simultaneously operating all of said implements in one direction, means for independently operating each of said implements in the opposite direction, and pins carried by the main frame and arranged to limit the movement of the implements toward the table.

4. A machine of the class described comprising a main frame, a motor carried thereby, a main shaft supported in the frame and operated by the motor, a table secured upon said shaft, a series of independent meat treating implements supported by the frame and operative above the table, said implements being arranged at respective right angles with relation to each other, means actuated by the auxiliary shaft for simultaneously operating all of said implements in one direction, means for independently operating said implements in the opposite direction, and a braking means for the auxiliary shaft.

5. A machine of the class described comprising a main frame, a main shaft mounted thereon, a motor carried by the frame and arranged to carry the shaft, a table carried by the main shaft, a plurality of independently mounted knives carried by the main frame and overlying the table, a pounder supported by the main frame and overlying the table, each of said knives and the pounder being arranged at right angles to each other, means for simultaneously operating said knives and pounder in one direction in the operation of the motor, and means for operating the knives and pounder in the opposite direction.

In testimony whereof, I affix my signature in presence of two witnesses.

ORANGE TALTON.

Witnesses:
    JARRETT C. HILL,
    WILLIAM TALTON.